United States Patent
Frankel et al.

(10) Patent No.: US 7,610,614 B1
(45) Date of Patent: Oct. 27, 2009

(54) CRYPTOGRAPHIC CONTROL AND MAINTENANCE OF ORGANIZATIONAL STRUCTURE AND FUNCTIONS

(75) Inventors: Yair Frankel, Westfield, NJ (US); Charles T. Montgomery, Saverna Park, MD (US); Marcel M. Yung, New York, NY (US)

(73) Assignee: Certco, Inc., New York, NY (US)

( * ) Notice: Subject to any disclaimer, the term of this patent is extended or adjusted under 35 U.S.C. 154(b) by 0 days.

(21) Appl. No.: 09/503,181

(22) Filed: Feb. 14, 2000

Related U.S. Application Data

(60) Provisional application No. 60/120,436, filed on Feb. 17, 1999.

(51) Int. Cl.
*G06F 21/00* (2006.01)

(52) U.S. Cl. .................. 726/4; 713/182; 726/6

(58) Field of Classification Search ........... 713/182; 705/1, 50, 67, 51; 726/6, 1, 4; 380/260
See application file for complete search history.

(56) References Cited

U.S. PATENT DOCUMENTS

| | | | |
|---|---|---|---|
| 5,825,880 A | 10/1998 | Sudia | |
| 5,867,578 A | 2/1999 | Brickell | |
| 5,892,900 A * | 4/1999 | Ginter et al. | 726/26 |

OTHER PUBLICATIONS

Lampson et al., Authentication in Distributed Systems: Theory and Practice Nov. 1992, ACM Transactions on Computer Systems, vol. 10 No. 4, pp. 265-310).*

Rational Software Corporation, Unified Modeling Language Semantics version 1.0 1997, p. 93-96.*

International Search Report, dated Aug. 8, 2000 for PCT Application No. PCT/US00/04138.

Lampson et al., "Authentication in Distributed Systems: Theory and Practice", *ACM Transactions on Computer Systems*, vol. 10, No. 4, Nov. 1992, pp. 265-310.

Frankel et al., "Optimal-Resilience Proactive Public-Key Cryptosystems", *IEEE Symposium on Foundations of Computer Science*, Oct. 20, 1997, pp. 384-393.

Hayton et al., "Access Control in an Open Distributed Environment", *IEEE Computer Soc.*, May 3-6, 1998, pp. 3-14.

Desmedt, "Threshold Cryptography", *European Transactions on Telecommunications and Related Technologies*, vol. 5, No. 4, Jul. 1994, pp. 35-43.

* cited by examiner

*Primary Examiner*—Gilberto Barron, Jr.
*Assistant Examiner*—Samson B Lemma
(74) *Attorney, Agent, or Firm*—Pillsbury Winthrop Shaw Pittman LLP

(57) ABSTRACT

Methods, systems and devices for cryptographic control and maintenance of organizational structure and functions are provided. A method for control and maintenance of an operational organizational structure, the method includes associating entities with cryptographic capabilities; organizing entities within the organizational structure as roles; and maintaining roles within the organizational structure. The system may involve at least a Public Key Infrastructure operation. Elements in said organizational structure may be assigned to roles and/or groups within said organizational structure.

54 Claims, 7 Drawing Sheets

| Version | 1.1 |
|---|---|
| Serial Number | 12345 |
| Signature Algorithm | RSA+MD2, 1024 |
| Issuer | C=US, S=NY, O=Xcorp |
| Validity | 1/1/98 - 12/31/99 |
| Subject | C=US,S=NY, O=Xcorp,CN=John |
| Subject Public Key Info | RSA, 1024, public key value |
| Other info. | Roles, policies, reliance limits, etc |
| Signature of CA | (based on all the above, public info and CA's private key |

Fig. 2

CRYPTOGRAPHIC CONTROL AND MAINTENANCE OF ORGANIZATIONAL STRUCTURE AND FUNCTIONS

This application claims the benefit of U.S. Provisional application No. 60/120,436, filed Feb. 17, 1999.

RELATED APPLICATIONS

This patent is related to and claims priority under 35 USC § 120 as a continuation-in-part from provisional U.S. Patent Application No. 60/120,436, titled "A METHOD FOR CRYPTOGRAPHIC CONTROL AND MAINTENANCE OF ORGANIZATIONAL STRUCTURE AND FUNCTIONS," and filed Feb. 17, 1999, which is incorporated herein by reference.

This patent is related to and claims priority under 35 USC § 120 as a continuation-in-part from co-pending U.S. patent application Ser. No. 09/492,534, filed Jan. 27, 2000, titled "Methods For Operating Infrastructure Applications For Cryptographically-Supported Services," now U.S. Pat. No. 7,184,988, which is incorporated herein by reference.

BACKGROUND

1. Field of the Invention

This invention relates to cryptographic control and maintenance of entities within an organization or a group of organizations. More specifically, this invention relates to trustworthy, authentic, authorized, reliable and flexible cryptographic control and maintenance of entities which are automated using computer and computer communication networks, and which hold electronic data organized in databases or directories.

2. Background & Summary

Cryptography is a basic tool for secure and reliable control of electronic transactions and processes within organizations. Control tools in organizations are often required to support multi-entity decision making in remote executions of processes within a commercial and financial body (e.g., board decision making, contract signing, memory of understanding signing, buying and selling, hiring, shipping, etc.). However, the inside of an organization (e.g., a commercial and financial body) can be quite complex both legally and technically in the commercial world. This is so since an organization can be either a single business entity (e.g., a corporation, a partnership, etc.) or a multi-business entity (e.g., an inter-banking organization, a consortium, etc.). Other types of organizations are not excluded by the above examples or any of the examples used throughout this description. Individuals are considered to be the building blocks of an organization. Individuals themselves may be a more compound sub-structure of the organization and the notion of an individual is also merely an example of an atomic body within an organization.

All the entities involved may be themselves or may own certain automated devices that typically involve computers, communication networks, aided devices (such as telephones, auxiliary computers, smart-cards, etc.). Entities may be individuals or groups or software agents or hardware devices or combinations thereof. The invention applies, without limitation, to all of the above entities.

Cryptographic representation of an organization has typically been defined statically, for a given time. Certain rules and capabilities associated with an entity in an organization are represented in the cryptographic representation (e.g., within certification authority (CA) technology, access to a trusted public key, Kerberos, etc.). Co-pending U.S. patent application Ser. No. 09/492,534, filed Jan. 27, 2000, titled "Methods For Operating Infrastructure Applications For Cryptographically-Supported Services," discloses, inter alia, methods for provision of a service to an organization based on cryptographic representation of the organization. U.S. patent application Ser. No. 09/492,534 is incorporated herein by reference.

This invention provides for controlling and maintaining organizational or structural changes inside an entity (e.g., commercial or financial entity). This adds a level of complexity in managing the "inside" of an entity. It is common for commercial and financial bodies to undergo organizational changes which may modify the control structure over processes and transactions. These changes generally are not predictable and therefore there cannot be an a priori understanding of the security and flexibility implications of these changes. In fact, the control structures implemented by security engineers may result in an highly inflexible infrastructure which may be very secure but also very static. This may be typically attributed to failing to take into consideration the dynamic nature of business. For instance, when two banks merge together into a single financial entity, there are new "agents" in the system which will be part of the overall control, there may be new regulations which now apply, and different trading constraints as well as opportunities may develop. In various aspects, this invention provides cryptographic control which is flexible enough for the modern global and dynamic market, i.e., that assures proper "change Control."

In the area of certification authorization there is a debate on representation of certificate by "name of entity/individual" vs. representation by "roles" within an organization. A dynamic organization, according to the present invention, can act as a tool that bridges the gap between these two representations as a special case. In fact, this invention provides a method to connect two or more representations of entities. This can be generalized to connecting any number of representations at the same level, hierarchically or only partially. The mechanisms in this invention are flexible and connecting parties can be incorporated in many types of structures or substructures (e.g., multi-domain Kerberos, PGP system where certification is flat, etc.), though the common example today is hierarchical.

Changes can also be applied to inter-organization relationships. Management of business organizations based on temporal or contractual limitations is needed. Dynamic management of relationships based on changing inter-entity connections (supply-chain management, partnerships management, joint venture management, etc.) are provided.

In addition to the dynamic nature or relationships inter-organizational agreements and responsibilities may demand complete control of locally maintained software, hardware and parameters. In some aspects, this invention provides a layer of organizing individuals into roles and groups within an organization. Note that a hierarchical application of the methods according to the present invention is possible where the organized elements become individuals for the next organizational layer. The organization can be a hierarchy, as well as based on various sub-structures and more complex relationships among individuals. The structure and relationships may differ based on which element belongs to which sub-organization (or separate organization). Also, it may be assumed that an entity is assigned a so-called "role" which defines its function, and it may be desirable to change the function itself (e.g., by changing hardware devices, modules, software).

In some aspects, this invention provides cryptographic controls within organizations. The present invention, in some aspects, relies on the following:

1. Fault-tolerant cryptographic designs supported by a method of describing the structure of an organization gives rise to an extended flexible design that enables enhanced functionality of the underlying control. This functionality deals with today's dynamically changing business environments.
2. Flexibility of control is naturally achieved by having a flexible key management level which assures that many of the transactions and processes will not be affected by many of the potential structural changes. The key management components can be based, e.g., on mechanisms like a public key infrastructure.
3. Implicit and explicit change mechanisms for the control functions must be enabled. The former are invisible externally, whereas the later are noticeable and may need to be registered by the environment. Both types of mechanisms require an internal management function which can be achieved by combining traditional key management technology with dynamic access control technology. This enables the maintenance of the semantics of the organizational structure.
4. Anonymous changes, or moving functions anonymously within an organization, may be needed. It is not assumed that the structure is fully exposed and sub-structures may be dealt differently.
5. Change of the holders of cryptographic capability may be needed, as may there be a need to change a capability while either maintaining or changing the holder. Change can be, e.g., by means of installing or communicating authorized software programs, installing authorized hardware, moving devices, etc. Since not all computational implements and mechanisms are equally trustworthy, the ability to control precisely authorization for change is required and provided by the present invention. In addition, the implementation of high trust computational resources must contain within their own structure the ability to enforce proper authorization, as is provided by the present invention.

A trustworthy and authorized approach is needed and provided by the present invention to control the control method (s) of the invention itself (e.g., authorized data and software updating). the present invention maintains self-awareness which determines the capabilities that an element in the structure allows. The method(s) according to aspects of the present invention disclose control management and maintenance mechanisms that are useful in many scenarios and many changes that the organization goes through such as, e.g.:

Internal: Changing of structure like departmental and divisional changes as well as internal personnel changes, especially in the world of corporate reorganization and re-engineering. Change of business, for instance, addition or removal of product lines.

Environmental: Change in regulation, law, common practices, underlying technology and the like.

External: Change which is due to interaction with other entities such as mergers, acquisitions, adding/removing partners, joining/dismemberment into/from consortiums etc. These changes involve previously external parties and may result in an update of what is internal and what is external.

Global: Changing many dependencies, such as changing the entire line of business, etc. while retaining legal connection to the past.

The above are not mutually exclusive. For instance, a merger may bring new officers and directors to a company. Even internal changes have an external affect as would be the case in hiring a new CEO or adding a new commercial/financial product/service line.

The changes can involve individuals:

Individuals may shift roles and may take various responsibilities by leaving and joining internal bodies. Roles of individuals and groups have changed in organizations. Indeed, it is recognized that organizations have to operate much more closely to their customers, which may require changes. This implies that hierarchical and vertical structures are not necessarily the best. Indeed, in high-technology and other fast-moving industries, the organizational structure must change to remain competitive and innovative. This implies a more chaotic structure and the need for versatile configurations that are capable to support creativity, innovations and entrepreneurship. This implies the need for flatter organization (and the elimination of many middle management functions). Modern companies engage in closer cooperation and communication internally and externally. Teams, which are usually temporary, become major organizational building blocks. As new products, customers and ways of competing are sought, new organizational structures based on new teams are created. Modern business practice can be more decentralized so that manufacturing can be done in remote locations where it is cheap while strong control can be retained by management; this is the model of many successful companies.

Other changes involve the organizations themselves:

Restructuring of companies may be a result of a new strategy and/or a new assessment of the market. Downsizing as well as hiring and expansion of business may take place. Externally, partnerships and alliances may be sought as strategic growth is looked for. These typically involve new contracts and new control functions. New agreements have to be monitored and the expected advantages have to be verified, tuned and adjusted as time goes on by a joint management and control team. Similar issues arise in setting up a consortium or a joint venture by a number of companies which manage it jointly.

Similarly, break-ups and spin-offs on the one hand and mergers and acquisitions on the other hand are changes involving external bodies. They are motivated by business strategy, growth opportunities, combining technologies or by regulatory requirements (e.g., antitrust or competition laws). In recent years, firms in certain industries are consolidating by mergers, whereas other industries exhibit break ups and spin-offs.

Another issue is outsourcing capabilities which may be run by one organization on behalf of an entity and may be move to another organization or to the entity itself. This refines some notions of services by not only changing service statically but also dynamically changing roles, structures and functionaries as service is moved. For the notion of service bureau by one organization or some organization giving service to another organization, this is an added feature of aspects of the present invention.

To summarize, dynamic flexible design is crucial for maintaining life-cycle support of organizations. Without limitation, this invention concentrates on systems that employ cryptographic components as their basic control structure (for signing, decrypting, and validating actions).

The above illustrates many scenarios which require the control and maintenance that the present invention offers.

BRIEF DESCRIPTION OF THE DRAWINGS

The objects and advantages of the invention will be apparent upon consideration of the following detailed description, taken in conjunction with the accompanying drawings, in which the reference characters refer to like parts throughout and in which:

FIG. 2 depicts the basic structure of a certificate;

DETAILED DESCRIPTION

Figure 1:
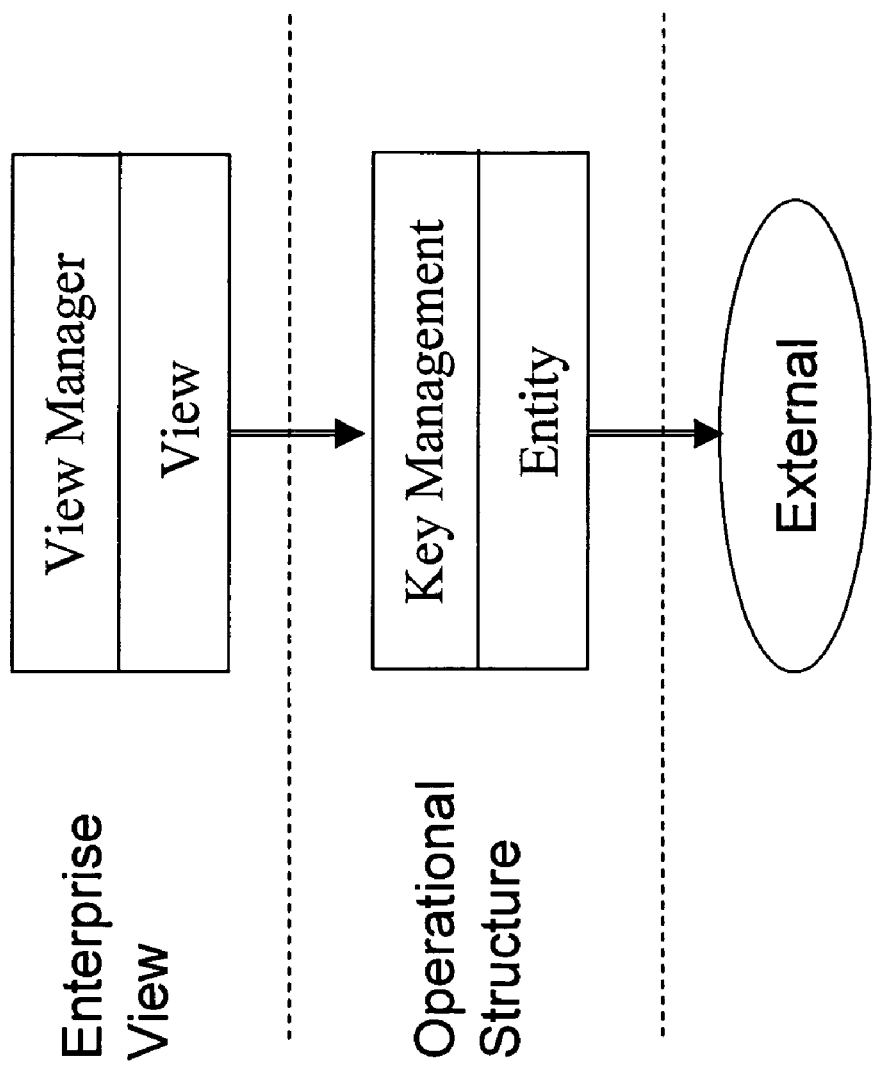
FIG. 1 schematically demonstrates the dynamic flexible control of cryptographic entities within an enterprise.

Before describing embodiments of the present invention, the basic components and their operations are described.

Database component: a database directories and database management system (see, e.g., C. J. Date, *An Introduction to Database Systems*, The Systems Programming Series, Addison Wesley, (4-th ed.) 1986) with standard operations: modify, erase, find, and other maintenance operations is available. Database technology also enables representation of data in various ways and with as partial views with respect to different users. An example of directory management is LDAP (described in Timothy A. Howes and Mark C. Smith, *LDAP: programming directory-enabled applications with lightweight directory access protocol*, MacMillan Technology Publishing, Indianapolis, Ind., 1997.). The basic structure of commands and queries as well as maintenance and management of the system is known in the art and available.

Authorization technology which defines capabilities of entities is available. For example, certain database systems have such authorization mechanisms built in. One skilled in the art will be familiar with general information processing practices and would be familiar with this component which is prevalent in many of the database management systems (see, e.g., Dorothy E. R. Denning, *Cryptography and Data Security*, Addison-Wesley, 1982. IEEE Security and Privacy, 1996).

Cryptographic Capabilities: these are represented by basic cryptographic technologies such as public key and signature schemes (see, e.g., Bruce Schneier, *Applied Cryptography*, John Willey and Sons Indc, (2d Ed.), 1996 (hereinafter "Schneier")).

Communication and Distributed Database technologies: these are also standard components in an information processing system (see, e.g., Andrew S. Tenenbaum, *Computer Networks*, Prentice Hall, 1988).

Key management component: this is crucial part of cryptographic sub-systems (see, e.g., Schneier).

Public key infrastructure (PKI) and certification authority (CA) technology (see, e.g., Schneier) are also very well known to those skilled in the art.

Logging and monitoring technology is also known to those skilled in the art. Cryptographic logging and independent logging (not under the control of the user) are familiar methodologies to those skilled in the art (see, e.g., Derek Atkins et al. *Internet Security: Professional Reference*, New Riders Publishing, Indianapolis, Ind., 1996).

Threshold and Distributed Cryptography techniques (as in, e.g., A. De Santis, Y. Desmedt, Y. Frankel, and M. Yung, *How to Share a Function Securely*, ACM STOC {94}, pp. 522-533, and other methods known in the art).

Embodiments of the present invention employ, as components, some or all of the above available techniques.

In some preferred embodiments, control is in cryptographic systems (mainly public key methods). In such systems the key management functions include much of the control. Indeed, the group or individual holding a certain key own a cryptographic capability which is typically exclusive and can be employed with confidentiality, authenticity and integrity.

Thus, in order to manage an organization, it is necessary to manage the roles held by individuals and groupings of individuals. Business practices typically assign roles to individual, committees, team, or a functional unit in an organization. These roles allow agents to be able to make certain decisions and perform certain tasks. Many tasks need control and recording and in modern organization are computerized and cryptography can be the tool for both. In some aspects, the present invention suggests and provides a design which is flexible to accommodate dynamically changing enterprises.

FIG. 1 schematically demonstrates the dynamic flexible control of cryptographic entities within an enterprise. It distinguishes two layers: the enterprise description which manages a dynamic organization and the operational structure which is where the entities of the enterprise act.

The design of the present invention is now described in greater detail.

It is assumed that entities hold capabilities. One typical way to represent capability is via a certified public key. The certificate signed by a certification authority (CA) represents a capability. The basic structure of a certificate is given in FIG. 2.

In managing the elements holding cryptographic capabilities, the present invention concentrates on representing a group of one or more individuals as an organizational function or a role which is called an entity. It is assumed that a quorum of this entity (all members or a majority or some other subset) needs to approve a cryptographic function which represents an operation. Without loss of generality (an individual role is just a singleton group), we concentrate on managing a group such that a quorum (say majority) of the entity is necessary to perform an entity action. Indeed, many decisions and actions in an organization require a quorum control. Such are, e.g., decisions by the board of directors, approval of records, minutes etc., as well as management commands such as procurement, selling, contract signing, as well as operational commands in certain organizations such as approving a document and authorizing its publication.

It is assumed, again without loss of generality, that the cryptographic operation is a digital signature (other cryptographic functions, e.g., decryption and other services, e.g., those described in co-pending U.S. patent application Ser. No. 09/492,534, are possible to manage in a similar fashion). Signature is a typical operation and can be used for numerous business processes. The entity may be an internal entity (known only internally) or an external entity interacting with the environment.

Thus the organization has a so-called Operational Structure; it has two layers:

1. Entities: Which are the operating agents in the enterprise. The entities perform cryptographic actions according to a well-defined set of authorization rules; and
2. Entity Key Management: Which provides the cryptographic tools for entities and manages them.

Figure 3:
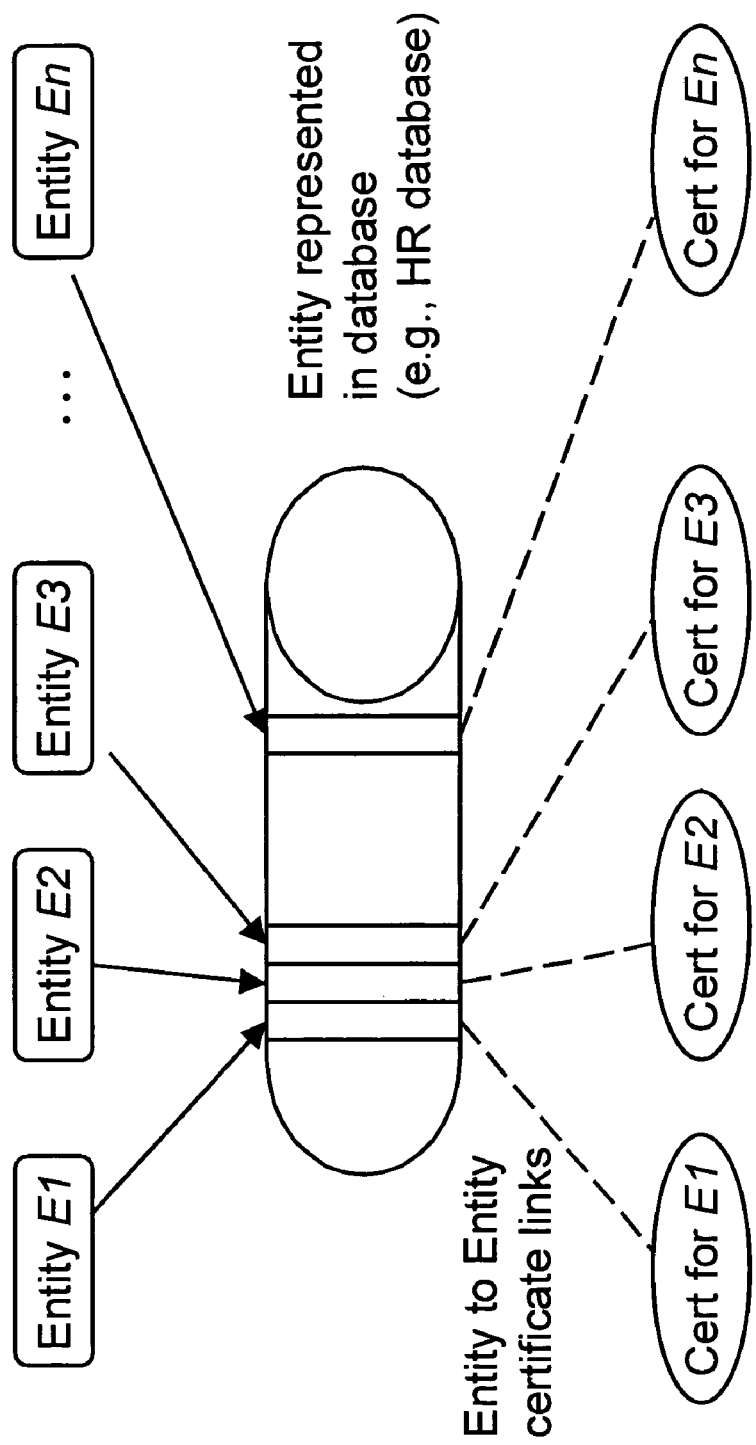
FIG. 3 depicts the structure of an enterprise.

The above is a static (instantaneous description) of an enterprise. The structure is depicted in FIG. 3 which shows an entity association with entity file and certificates. The entities in the organization are represented in a database with their data. In the example of FIG. 3, the database can be the Human Resources (HR) file. More generally, entities can be more general than individuals in an organization, but the structure and association can be more complex and non-atomic (e.g., via data linking and data reference methods which are standard in database and data structure technologies). As an example, the entities can be a department represented in a department file where the department structure includes its head, multiple manager of units, and member of units. Each department may be associated with various roles and each element in the department may have a different capability within each of the roles. The entity key management component associates certificates with entities (the association depicted as entity to entity-certificate links).

Note that organizing individuals within a department can be considered grouping operation were individuals are entities and department is a role/group. The association of individuals to departments can be managed by a view management component (discussed below) and hierarchically the association of department to roles of department can also be managed by a view management component.

Entities and groups (which represent entities) change over the lifetime of the firm.

The control of the entities and their roles is a major problem when organizations change. The set of officers, directors, authorized signatories for certain financial transaction typically change with the organizational change. Also, the authorization rules for applying an operation may change and the members of the group have to know about it.

In order to manage changes it is useful (possibly necessary) to control the key management layer (FIG. 1) which assigns cryptographic tools to entity members. In some aspects, the present invention can take the approach that with each key there is a set of authorization rules which control its usage and are part of the key, thus authorization changes as well can be managed by controlling key management.

Thus, whereas pure key management (for static organization) is controlled by a relatively simple semantics (which may include operations such as, e.g., key-generation, key-validation, key-invalidation, key-expiration, key-replacement, user-elimination, and the like), key management in a dynamic organization needs richer semantics. This implies the need for a layer of management on top of key management. In fact this management layer (see FIG. 1) is connected with managing the structure of the enterprise (called the Enterprise View herein) which is similar to the conceptual schema of the organization which describes the enterprise—however, security and cryptographic tools are added. It is based on the following two layers:

1. The View: The level which defines entities, the groupings which map individuals to roles as part of entities, and the authorization rules associated with entities. This can be looked as an access control of individual and (sub-)entities to entities. At any point of time, the view's integrity is protected.

2. View Management: The management layer which controls the dynamic changes. This is controlled by top management and human resources which act according to restructuring decisions and contracts as the organization change. It is by itself cryptographically controlled.

Figure 5:
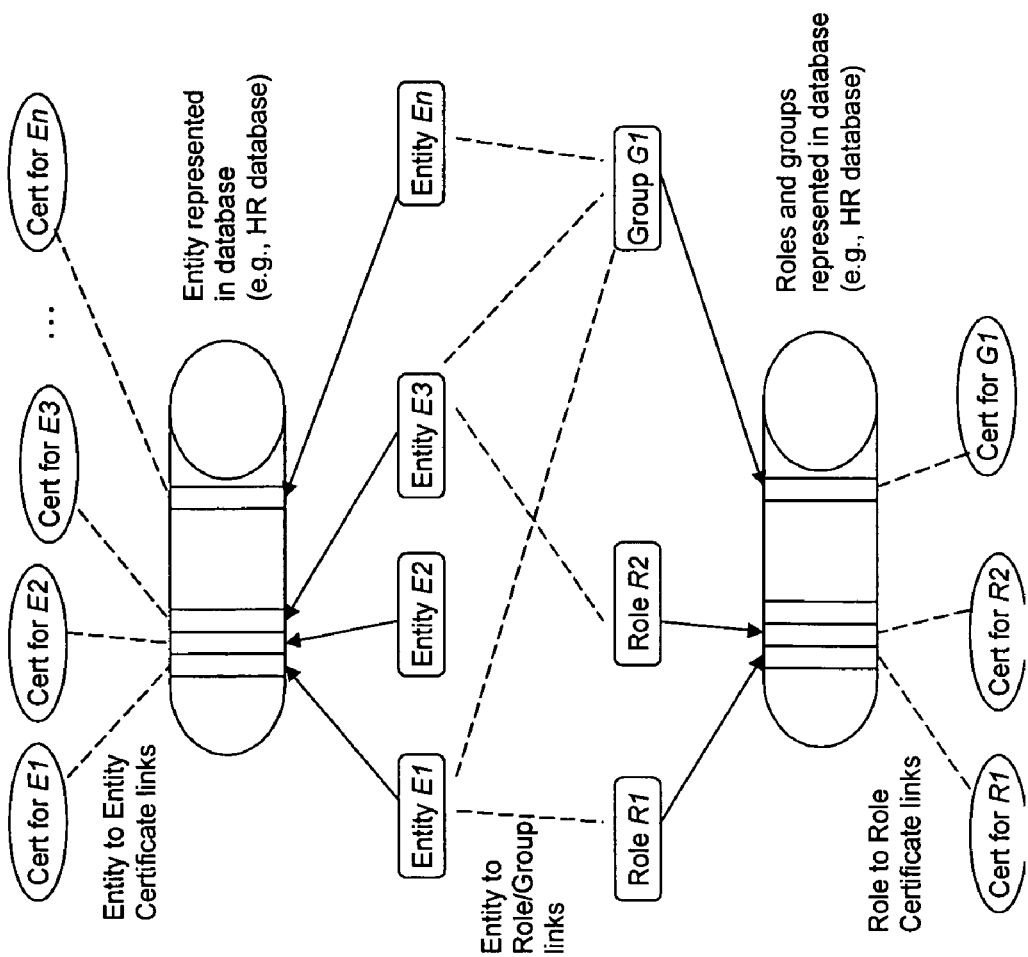
FIG. 5 depicts a roles and group database according to embodiments of the present invention.

In FIG. 5 the roles and groups database according to embodiments of the present invention is represented. Each role is associate with a capability which in this embodiment is a certificate. Certificates are exemplary in disclosure and other mechanisms are possible. The association of roles to their capabilities is equivalent to the association of entities to their certificates (as was explained above and depicted in FIG. 3).

Figure 4:
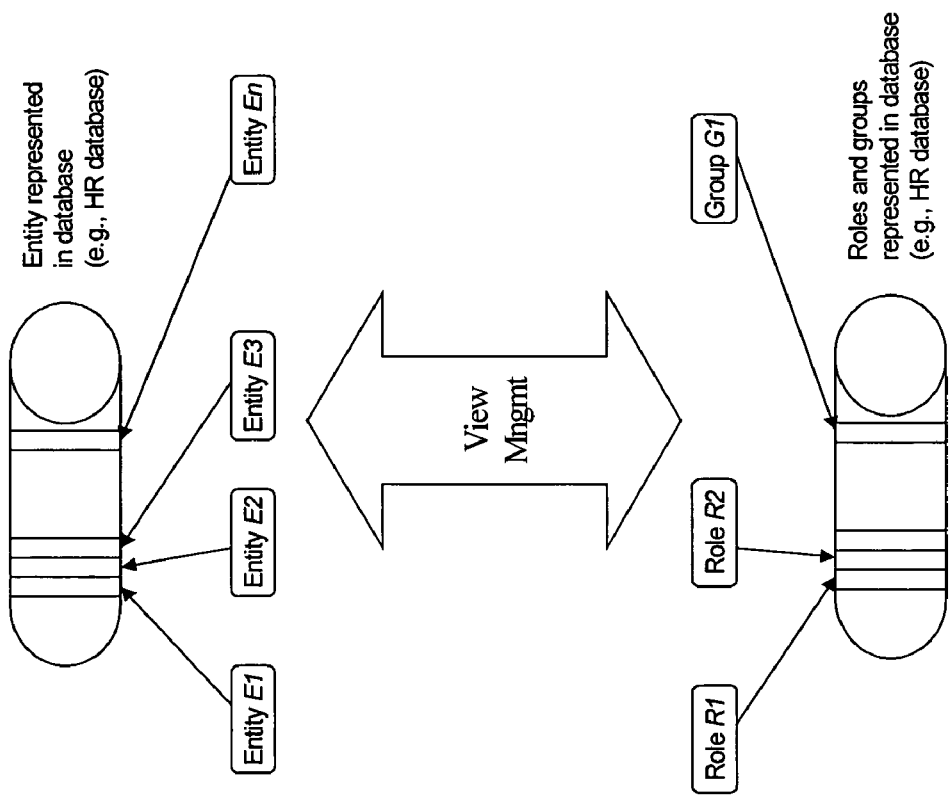
FIG. 4 locates the view management component as manipulating the connections between roles and entities according to embodiments of the present invention.

The association of entities to roles/groups is also depicted. The view defines the roles and groups and the view management is the component that deals with the association of entities to roles and groups as well as the management of the roles themselves. The view management component operates on roles groups and the associations of entities to them. This creates the dynamic organization. FIG. 4 locates the "view management" component (namely, the software and interfaces managing the system) as manipulating the connections between roles and entities. Note that the example concentrates on two files and the associations between them. This is a basic component, many files can be associated in various structures. The basic association and linking methods (known in the art of database management) are applicable to the present invention.

The view which defines the organization also define whether an entity's structure and inner workings is visible or invisible (or "partially visible, which combines the previous two). A visible entity has its structure exposed externally (to the other entity inside or outside the enterprise with which it interacts), an invisible entity is represented as a singleton entity to others. In particular, there may be a need to hide the inner workings of entities which interact with the external world (other enterprises); in order to either hide the structure, or to simplify and abstract the interface to the external world.

FIG. 5 depicts explicit group components according to embodiments of the present invention. The group is composed of entities E1, E2, ..., En. They are associated with an "explicit group G1 certificate" which mentions their identities and the policy under which a valid action (signature in our prime example) is to be accepted. Entities in the group certificate may be identified in many ways (e.g., links to their certificates or incorporation of their public key to the group certificates, etc.) and the policy may also be represented in many ways (e.g., encoded in another attribute such as name, a link to another data structure, encoded as shown, etc.). Namely, in the example, two signatures out of the group's individual signatures are required to make the G1 group's signature valid. Valid authenticated message from group G1, therefore, includes a data file and a signature on it by E1 and E3 (who are both members of the group). Under the group's certificate policy this is a valid signature. More complex policies are possible such as those requiring, e.g., two officers and three employees etc. The possibilities are complex. See also, e.g., Y. Frankel and M. Yung, *Distributed public key cryptography*, Proceedings of Public Key Cryptography '98, Springer-Verlag. (For example, with A. De Santis, Y. Desmedt, Y. Frankel, and M. Yung, *How to Share a Function Securely*, ACM STOC {94}, pp. 522-533. the secret can be broken as a sum of multiple secrets. Then each secret is shared by the appropriate entities such as one secret by officers and another by employees. Signing requires actions based on both secret). An entity (e.g., E1) may also be implicit as discussed below or some other abstraction.

Figure 6:
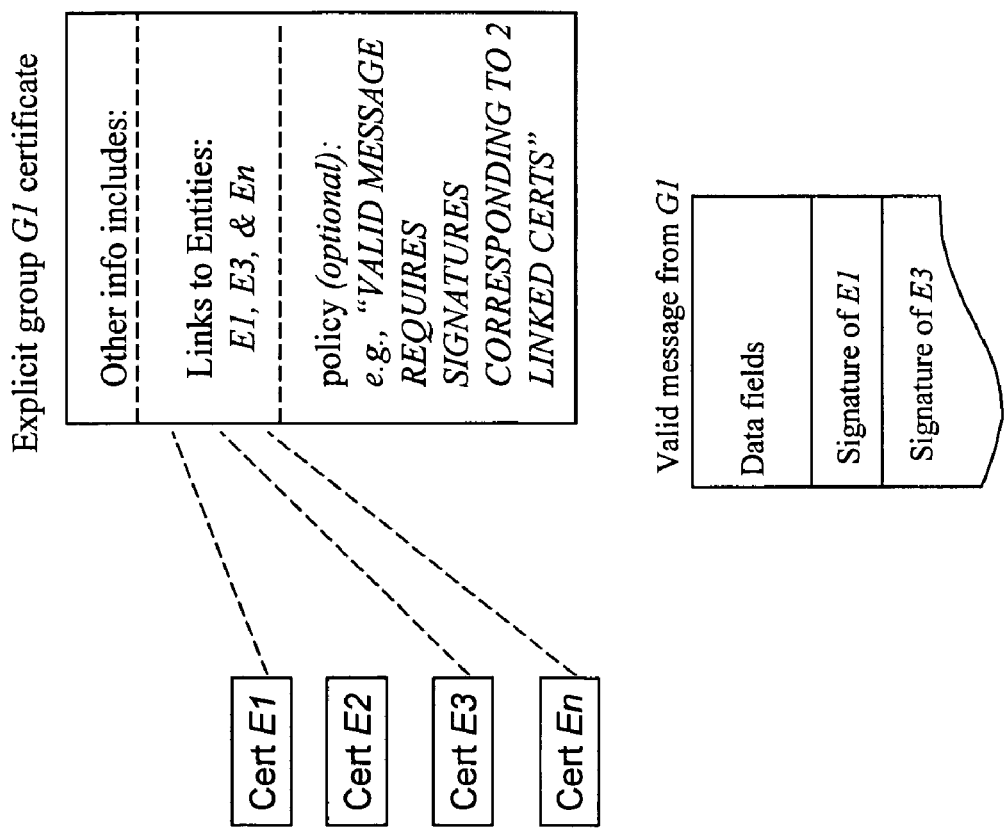
FIG. 6 depicts an explicit group components.
Figure 7:
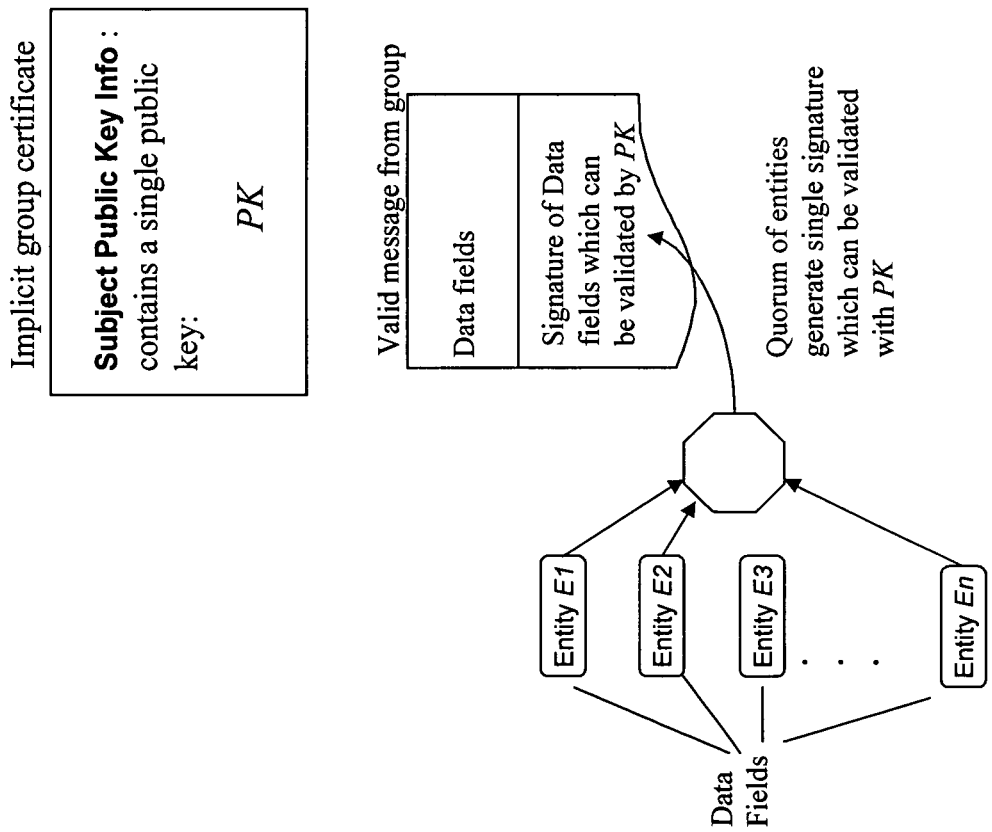
FIG. 7 depicts the representation and action of an implicit group.

In FIG. 6 the representation and action of an implicit group is depicted. The certificate includes a public key of the group. The action (signature) is signature which is a valid message which is a signature on the data fields which is verifiable by the public key. The creation of the valid signature is by at least a quorum of the group which acts on the data filed (each member produces what known in the art as partial signatures, these are combined easily to have a signature only if quorum or more of them is made available. The data fields have to be the input to a quorum of the entities E1, E2, . . . , En. Then the combination can write down the signature of the data fields.

The technological components of the methods according to embodiments of the present invention employ cryptographic devices. The new enterprise view level manages a secure data base technology, it manages the availability and access to CA's, it manages reliable time-stamping, and it activates the key management function (at the various CA's and as protocols among participants in an entity). The new enterprise view level achieves the right level of flexibility that future business will need once they rely on cryptographic controls.

Note that the elements themselves (individuals) have internal control and self awareness function and they control the changes in the environment to assure control of the control. In fact, they may accept remote software procedures or applets which are signed correctly or otherwise authenticated and authorized. As a result, the elements are modified.

Further, the management itself can be managed (meta-management). Hierarchical and recursive structure of control are possible and its implementation is immediate from the description of a single layer of organization, to one familiar with re-usability of software and information processing technology.

Note too that the transfer of function from an organization to another organization as well as moving of capability is also made possible by the methods of the present invention. Using cryptography itself, one can make only partial view of the structure to some entities. Other cryptographic controls can be employed using standard cryptographic methods known in the art. All these additions and variations are within the scope of the current invention.

There is an operational organization or a conglomerate of organizations or organizations which are bound together under contractual or otherwise agreement. The methodology of the present invention enables maintaining, controlling and changing the functioning of the entity based on operational changes of entities, organizational changes (such as, e.g., a change in the organizational chart and other personnel and assignment changes).

One useful configuration is a organization which gives services on behalf of other organizations. When using the methods of the present invention, the nature of the service can change and functions can move between the organizations as the business relationships change. For example, a CA service moves from one organization to another. This is a demonstrative relation. Notice that the granularity of the change can be per entity or per role/group.

Another useful configuration is entities which are defined within one organization, and roles which are defined within another. This may represent a collaboration and allowing certain capabilities to outside bodies. It fits within the modern firm organization which may use outsourcing, co-development, tightly coupled supply-chain relationship with external companies for the sake of improved manufacturing and services, etc. Similar analogous inter-organizational relationships are possible and are within the scope of the present invention.

The basic general designs of the cryptographic control of (group) entities according to the present invention are now described. First a detailed management of visible and invisible entities in the organization is described. The basic software technologies and components that are needed within the system implementing embodiments of the invention are also described.

The description uses standard database management terminology, access-control terminology and operations, cryptographic and key management technology (in hardware or software). Similarly, communication architecture terminology used is standard in the art. It is assumed the underlying computer and communication architectures are available and embodiments of the invention employ the basic technologies as building blocks, adding control, algorithms and automated procedures to achieve its overall goal.

The Enterprise Description Layer

The "enterprise view" function (see, e.g., FIG. 1) employs access control technology (e.g., see B. Lampson, *Protection*, 5-th Princeton Symp. on Information Sciences 71, (Published 74 in ACM's Operating Systems Review)), in particular, dynamic access control as described, e.g., in R. J. Hayton, J. M. Bacon and K. Moody, *Access Control in an Open Distributed Environment*, IEEE Security and Privacy, 98, pp. 3-14). It can be used to bridge an "individual-based" (Identity-based) organization and a "role-based" organization where functional cryptographic tools are controlled. For large organizations, it can employ CA technology and, in particular systems of "trust management" e.g., as defined by Policy-Maker suggested in M. Blaze, J. Feigenbaum and J. Lacey, *Decentralized Trust Management*, IEEE Security and Privacy, 1996); its use here is to define the structure of entities and their group members. Similarly SDSI or SPKI can be used (described, e.g., in C. M. Ellision, *SPKI Certificate Document*. 1998. (Document available also in URL http://ftp.clark.net/pub/cme/html/spki.html); and R. Rivest and B. Lampson, *SDSI—A simple distributed security infrastructure*. (See also, http://theory.lcs.mit.edu/~cis/sdsi.html)) (and only partial functionality of the above is needed). The layer thus maintains a database of the dependencies and dictates the structure to the entity level. This level is managed and capabilities (certificate) are given to entities to represent them.

The view management function is the key management of the enterprise description level. It assures that the organizational changes are performed or authorized by the proper functions within the organization. This assures compliance with restructuring decisions, contracts, policy etc. In a small organization it can be performed by the security officers whereas in larger distributed organizations it will require a quorum management which itself is based on a quorum of security officers and where policy is signed by the enterprise executive management (which makes reorganization, restructuring and personnel assignment decisions, as well as changes required by law and by legal agreements). In cases of multi-lateral agreements, the set of security officers act originally in duplication but the result is a combined enterprise which can continue to work. Note that the view management layer has to manage itself as well. Namely adding, deleting, merging of officers has to be done at that level itself.

The activation of the control which deals dynamically with an entity, is done by calling key management functions which involve the agents (individual and sub-entities) comprising the entity itself. The operations which are needed include the following maintenance and management operations:

1. Define Entity: assigns a name and characteristics to an entity (in particular it defines the entity's size and the threshold for a quorum (or similar rules) and whether the entity is to be visible or not and similar properties). The Define Entity operation also defines an initial set of individuals and other (sub-)entities that define the initial entity.

2. Define Authorization rules: defines the operation(s) allowed and the rules for acting.
3. Add member to entity: specifies the enrollment of a new member into an entity.
4. Remove member from entity: specifies the dis-enrollment of a member from an entity.
5. Modify rules: adds, deletes or change an authorization rule.
6. Modify functionality, control and parameters: the environment an entity behaves in changes (e.g., hardware and software updates). These alteration operations are performed in a trustworthy way.
7. Change entity characteristics: maintains the properties of the entity. In particular can change its size or size of threshold, change it from being visible to being invisible etc.
8. Remove/Refresh/Suspend Entity: discontinues the entity, etc.

The above operations are performed via traditional database management system familiar to the skilled in the art. They are further accompanied by actions related to certificate management at the role level (e.g., certificate creation, suspension, revocation, etc.). There are many ways to implement the above in the art.

Visible Entity Management Implementation

The present invention implements and provides control of a group of elements which together form an entity with its structure and rules exposed to the outside elements dealing with this entity.

Recall that we focused on the action an entity takes is signing, thus the tool which seems suitable here is the notion of multi signature. This is a static tool which associates a group of users and their individual signature to an entity by requiring everyone (or possibly a subset) to sign with an individual signature. Once a multi-signature is given, one can verify each individual signature and check that the action is authorized.

However, dynamic management is needed and individuals may leave or be added to a group. The technology which deals with creating and dealing with failures of signature schemes is a CA (Certification Authority) with a CRL (Certificate Revocation Lists) publication. Typically, a certificate is revoked when the key is compromised. A certificate is also invalid if expired. For a discussion on revocation see, e.g., B. Fox and B. LaMacchia, *Certificate Revocation: Mechanisms and Meaning*, Financial Cryptography 98, pp. 158-164 and the three papers attached to it.

For dynamic entity management, the notion of "Entity Certificate" which links to existing individual certificates is needed. The entities can be managed by always changing the entity certificate, revoking the old entity and certifying the new entity. It may be desirable to keep revoked entities and have a history available (a time-stamping technology may be used [see, e.g., S. Haber and W. S. Stornetta, *How to Time-Stamp a Digital Document*, Journal of Cryptography, v. 3 n. 2, 1991, Springer International, pp. 99-112].

Once an entity certificate is defined, connections via rules between certificates can be expressed as was defined and also implemented in the work on certifying trust by H. Lehti and P. Nikander, *Certifying Trust*, PKC 98, LNCS Springer 1431, pp. 83-98. The access control framework of R. J. Hayton, J. M. Bacon and K. Moody, *Access Control in an Open Distributed Environment*, IEEE Security and Privacy, 98, pp. 3-14 is also applicable.

The dynamic management of the enterprise view is performed as follows:

1. Define Entity: The enterprise (internal or external) CA issues a new certificate to the entity name and assigns characteristics to it. It links the names of the initial set of individuals (point to their key/certificate) which are members.
2. Define Authorization rules: The rules are put in the certificate.
3. Any modification: The old entity certificate is revoked and a new certificate is issued reflecting the change.

A basic CA technology and reliable time stamping are needed so that using certification with date and entity management gives an explicit record. The combination of issuance and revocation which was originally done for security (key renewals) and coping with failures such as key compromises which need revocation, can serve to manage entity dynamically. The Certificate technology can be used to define multi-signature by allowing a certificate which includes pointers to a group of keys (or alternatively aggregate certificates) rather than having its own user key inside the certificate. Such extensions are possible based on the art.

Invisible Entity Management Implementation

The tool to implement an entity whose internal workings are invisible is naturally that of function sharing (threshold cryptosystems); which can be used to share a signature key amongst individual such that each one has a shadow key (e.g., [Y. Frankel, P. Gemmel, P. MacKenzie and M. Yung. *Optimal Resilience Proactive Public Key Systems*, FOCS {97} (hereinafter "FGMY")] [F89, DF91, DDFY]). On an input, if any threshold of individual produces partial signatures (their keys applied to the input), it is easy to combine these to a signature on the input. If less than the threshold collude in arbitrary way the signature scheme is secure (in particular the adversary now has to get as many keys as the threshold to break the scheme).

The notion of proactive security, tolerates dynamic adversary (see, e.g., R. Ostrovsky and M. Yung, *How to withstand mobile virus attacks*, Proc. of the 10th ACM Symposium on the Principles of Distributed Computing, 1991, pp. 51-61). When applied to cryptosystems [A. Herzberg, M. Jakobsson, S. Jarecki, H. Krawczyk, M. Yung, *Proactive Public-Key and Signature Schemes*, ACM CCS {97}; and Y. Frankel, P. Gemmel, P. MacKenzie and M. Yung. *Optimal Resilience Proactive Public Key Systems*, FOCS {97}], it creates a system which re-randomizes the shares periodically, so its original goal is increased security against mobile adversary (allowing the adversary to control up to the threshold in each period). This technology can, however, be combined with the rejoin failure originally defined and developed in Z. Galil, S. Haber and M. Yung, *Cryptographic Computations: Secure Fault Tolerant Protocols in the Public Key Model*, Crypto 87, pp. 135-155, and it can allow as was done in Y. Frankel, P. Gemmel, P. MacKenzie and M. Yung. *Optimal Resilience Proactive Public Key Systems*, FOCS {97} to "add" and "remove" individuals and at the same time change the size and threshold size parameters. These provide some of the flexibility discussed earlier.

Assume now that we have to manage the "board of directors" entity of a company. The board signs on records, decisions, and other documents. For instance it signs on decisions regarding the "size and membership" of the board itself. The board is represented by a threshold function and if there is a signature it means that the majority approves, sometimes we may want to assure that all have voted so we may have another key representing (unanimous board decision—where the threshold is the size of the board). When the board decides to manage itself, it run some of the proactive maintenance protocols (disenrollment, join, size increase, threshold change).

Management of the operations still needs an internal record, so an "internal CA" manages the view using "entity certificate" as before—pointing to individuals etc. However, when a change is performed, the "proactive key management function" of the entity is invoked to perform the maintenance protocol routine. The visible entities are certified by the "external CA" (a few levels of internal/external are also possible). The choice of which CA is made possible in which realm is managed by the enterprise view level.

Below are few examples of maintenance operation of invisible entity:

Define Entity: The entity is created in the internal CA as an entity certificate is issued. In addition a key generation and distribution for the group is executed. The external CA issues an entity certificate for this key.

Define Authorization rules: defines the operation allowed and the rules for acting and is posed in the internal certificate. The threshold of honest participants in the entity is assumed to enforce the rules.

Add member to entity: specifies the enrollment of a new member into an entity. This is reflected by a change of the internal entity certificate and in addition a "key redistribution" amongst the new set of participants is being executed. As an example, in FGMY, a key that was distributed in at out of n polynomial (polynomial of degree t) will be redistributed into a new t out of n+1 polynomial which will be distributed to the new member.

Remove member from entity: Similar to the above in the [FGMY] example, but the new polynomial will be distributed to n−1 members excluding the member that was removed.

Change entity characteristics: Similar to the above in the [FGMY] example but change the threshold size so that we can now redistribute the secret from a t out of n polynomial to a t' out of n polynomial, which will mean that now t' participants have to act.

Remove/Refresh/Suspend Entity: Revoking the external certificate will in effect terminate or suspend the role of the entity, delegation with time-stamp may refresh.

The above operations involve a database management mechanisms which are followed by and tightly coupled with (in fact) with operation of the certification authority. The transaction system implementing the management operation has to be atomic and assure complete update upon an operation.

Management of Management: Meta-Control of Elements

The officers and other authorized party in an organization or organizations, may be a layer which is maintained in the same fashion as above. Their security officer capabilities may be managed as roles.

Elements in the system may be controlled remotely and managed via software downloading or smartcard activation. In either case the elements (entities, groups, etc.) have to be aware of the change and have to identify authorization of the change. This is done via logging and memory of history as well as cryptographic authorization (access control) within the element. The later can be implemented via digital signatures as authorization list.

The modified roles are logged and reputed to an outside management that oversees the operation. Various ways to achieve this is known in the art.

The result of this is that entity may be readily exposed to control changes which increases the flexibility and power of the definition of roles within organizations. Careful authorization, in turn, assures trustworthy and reliable management of the change of control and data.

At the top of the management and control chain there should be a way to assure validity and reliability of the system. This can be achieved by implicit sharing of the control or by strict procedural and contractual arrangement which assure certain procedures.

Management of Sub-Structure: Recursive and Hierarchical Management

There are many ways to allow many organizations to act. We may expose some parts of the organization and not others. Different entities and external viewers may get different view of the organization. This can be done with available database technology. Note that the implicit signature is an example since the entities which in the signature example are not exposed externally.

Management with Privacy and Anonymity

Cryptographic techniques may add anonymity and privacy to our method. roles may be used to "hide" entities under a "role." Data in the system may be encrypted and only the designated parts may access the information. Also note that representing the same database with different views to different entities is a typical database technology.

Adding Trust in Components

In practical implementations, not all components can be trusted to the same degree. For this reason various security critical operations (and the parameters important to their secure operation) are performed by special purpose computational components.

Such a device will generally be fabricated as a sealed unit in a tamper resistant package. Inside the package will be a computer chip, RAM for short term storage, flash memory (or equivalent) for long term storage, interface logic and in some cases battery maintained storage which can be altered if physical tampering is detected. The intended effect of the design is to provide an environment where private parameters can be stored and operated on by trusted software without fear of the security weaknesses associated with general purpose computers being an issue.

In its simplest form, the special purpose device is manufactured with a standard (and limited) set of functions programmed into the unit. It is shipped in this form to the customer. The customer can then arrange for any required private keys to be loaded onto the THD or generated internal to the device. The customer can use the functions provided but cannot change the functionally of the device and cannot change the internal software.

For some embodiments, a more complex system is used. More complex functions are likely to require upgrades over time.

The method of accomplishing the above in a special purpose device is as follows. The alteration or replacement of software or parameters in a special purpose device requires acceptance by the existing application program that has access to or makes use of the private parameters. In effect, the old installed software must approve its own replacement or modification. In operation the following steps would be preformed for an upgrade to entity B's software:

1) Present to the device the software upgrade with appended information.
2) If the baseline software is configured to check for a signature, then this check is performed.

3) The results of step 2 along with a hash of the software upgrade and appended information are passed as input to entity B's software.
4) Entity B's software can perform any additional checks it desires including repeating any public key signature check performed by the baseline software. A flag will be returned that indicates its acceptance or rejection of the software upgrade.
5) The baseline software will perform the upgrade only if entity B's software returned the flag indicating acceptance.

The fact that the application program has final approval supports a large number of options. For example, entity B can provide entity C with a software approval authority capability and design its software to accept upgrade only if signatures existed from both entity B and the entity C software authority. This would result in any upgrade requiring an additional approval from entity C. The effect is that a future compromise of software signature keys at either entity A or entity B should not have a detrimental security implementations for entity C.

There are extensions possible and they are considered to be part of the present invention. For example, consider entity A supplies entity B (who upgrades) who supplies entity D (who upgrades) who supplies entity C. By having the baseline software from entity A request load permission from installed entity B which in turn requests permission from installed pack D and also required approval from entity C.

This can be extended for changing a whole group at a time where the flag has to be agreed upon by the whole group and this is done in two steps where each component of the group checks independently and then each vote on the flag. The change is taken into affect based on policy (e.g., majority or total agreement with no objections, etc.)

Similar notions can be used for hardware updates where an entity's capability is represented in, for example, a smartcard. To replace capability as above, then a replacement can achieve the above but the replacement also has to be checked for authorization to new capability and old device (or a proxy, server, etc.) verifies new device and indicates acceptance with flag similar to above. If this check is done by a remote server it may require cryptographic protocols. A combined update of both hardware and software components is also possible.

It should also be noted that similarly one change the definition (e.g., function) of roles and groups as well.

Auxiliary Operations: Assuring Reliability

In order to maintain the high reliability of the system, standard audit trail and logging techniques are used, monitoring of activities by independent entity and comparing the logs safely are important. Other internal controls which assure proper operation within the defined role, are assumed. It is expected that any party may obtain reports.

Thus are provided methods, systems and devices for cryptographic control and maintenance of organizational structure and functions. One skilled in the art will appreciate that the present invention can be practiced by other than the described embodiments, which are presented for purposes of illustration and not limitation, and the present invention is limited only by the claims that follow.

We claim:

1. A method for control and maintenance of an operational organizational structure, involving cryptographic control and maintenance of entities within one or more business organizations, the method being automated using a computing device, the method comprising:
    associating cryptographic capabilities with electronic representations of entities within an organizational structure of the one or more business organizations;
    organizing entities within the organizational structure as roles through associating the electronic representations of entities with electronic representations of roles; and
    upon any addition, deletion or modification of an entity, a cryptographic capability, or any of their associations, maintaining roles within the organizational structure by adding, deleting or modifying electronic representations of the entities, cryptographic capabilities, roles, or any of their associations.

2. A method as in claim 1, wherein the method involves at least a public key infrastructure operation.

3. A method as in claim 1 wherein the control and maintenance further comprises:
    assigning elements in said organizational structure to roles within said organizational structure.

4. A method as in claim 1 wherein the control and maintenance further comprises:
    assigning elements in said organizational structure to groups within said organizational structure.

5. A method as in claim 3 wherein at least some of said elements are already grouped elements.

6. A method as in claim 1 wherein said method involves access control technology.

7. A method as in claim 1 wherein said method involves at least an access control operation.

8. A method as in claim 1 wherein said method involves at least a data-base operation.

9. A method as in claim 1 wherein said method involves at least one operation implemented in a hardware device.

10. A method as in claim 1 wherein the operational organizational structure represents at least one commercial organization.

11. A method as in claim 1 wherein the operational organizational structure represents at least two organizations, and wherein one of said organizations performs at least one function on behalf of another of said organizations.

12. A method as in claim 1 wherein the method further comprises changing software whose authorization is checked.

13. A method as in claim 1 wherein the method further comprises changing hardware.

14. A method as in claim 1 wherein the method further comprises moving hardware.

15. A system for control and maintenance of an operational structure involving at least one cryptographic method, entities within a business organization, characteristics of said entities and relationships between said entities, wherein the system comprises code executable by a computing device to:
    maintain electronic representations of capabilities of entities of a business organization;
    maintain electronic representations of functions of said entities;
    maintain electronic representations of characteristics of said entities;
    maintain electronic representations of relationships of said entities; and
    change the maintained electronic representations of said entities said characteristics and said relationships upon an addition, deletion, or modification of a characteristic or relationship of the entities.

16. A system as in claim 15 where at least one of said entities is an individual in an organization.

17. A system as in claim 15 where at least one of said entities is a group of individuals in an organization.

18. A system as in claim 15 where at least one capability is a role in an organization.

19. A system as in claim 15 where at least one capability is a task in an organization.

20. A system as in claim 15 where at least one function is an operation by a functionary in an organization.

21. A system as in claim 15 where at least one function is an operation by a group of functionaries in an organization.

22. A system as in claim 15 where said entities in an organization are represented in a public key infrastructure directory.

23. A system as in claim 15 where at least one of said characteristics and said relationships is represented in a directory.

24. A system as in claim 15 where at least one of said characteristics, at least one of said relationships, or both is represented in a public key infrastructure directory.

25. A system as in claim 15 where an operation of said system involves updating at least one directory.

26. A system as in claim 15 where an operation of said system involves updating at least one public key infrastructure directory.

27. A system as in claim 15 where said code to change said maintained elements comprises code to change information processing control structure.

28. A system as in claim 15 where said code to change said maintained elements comprises code to change cryptographic certification information within the public-key infrastructure directories.

29. A system as in claim 15 where said code to change said maintained elements comprises code to change databases.

30. A system as in claim 15 where said code to change said maintained elements comprises code to change cryptographic certification information within the public-key infrastructure directories and further database changes.

31. A system as in claim 15 where said entities, said characteristics and said relationships are maintained by combining databases components and components of certification authorities of a public key infrastructure.

32. A system as in claim 15 where said entities are represented in one directory and said characteristics and said relationships are represented in a second directory.

33. A system as in claim 15 where said entities are represented in at least a first directory and said characteristics and said relationships are represented in at least a second directory.

34. A system as in claim 15 comprising observers, where said entities said characteristics and said relationships are partially visible to various observers.

35. A system as in claim 15 where an operation of said system comprises cryptographic key management operations.

36. A system as in claim 15 where an operation of said system is activated by at least one designated entity amongst said entities.

37. A system as in claim 15 where an operation of said system is activated based on agreed upon rules.

38. A system as in claim 15 where an operation of said system is activated based on authorizations.

39. A system as in claim 15 where an operation of said system comprises database maintenance operations involving said entities said characteristics and said relationships.

40. A system as in claim 15 where said characteristics and said relationships define authorization rules.

41. A system as in claim 15 where said characteristics and said relationships define authorization rules based on access structure.

42. A system as in claim 15 where said characteristics and said relationships define authorization rules based on cryptographic capability.

43. A system as in claim 15 where said characteristics and said relationships define authorization rules based on shared cryptographic capability.

44. A system as in claim 15 with the additional operations of logging said system's operations.

45. A system as in claim 15 with the additional operations of logging said system's operations, where said logging is performed in various locations in said system.

46. A system as in claim 15 with the additional operations of monitoring operations within said system.

47. A system as in claim 15 with the additional operations of time-stamping operations within said system.

48. A system as in claim 15 where at least one of said system's operations is performed distributedly via communication.

49. A system as in claim 15 where at least one of said system's operations is a distributed database operation.

50. A system as in claim 15 where at least one of said system's operations involves physical handling of devices to one of said entities.

51. A method as in claim 1 where a plurality of entities are electronically visible to one part of the organization, a first set of outside viewers, or both, and roles or characteristics thereof are electronically visible to another part of the organization, a second set of outside viewers, or both.

52. A method as in claim 1 where maintaining of roles within the organizational structure is protected and can be performed only by an authorized party inside or outside the organization.

53. A system as in claim 15 where a plurality of entities are electronically visible to one part of the organization, a first set of outside viewers, or both, and roles or characteristics thereof are electronically visible to another part of the organization, a second set of outside viewers, or both.

54. A system as in claim 15 where change to the maintained electronic representations of said entities said characteristics or said relationships is protected and can be performed only by an authorized party inside or outside the organization.

* * * * *

UNITED STATES PATENT AND TRADEMARK OFFICE
CERTIFICATE OF CORRECTION

PATENT NO. : 7,610,614 B1  Page 1 of 1
APPLICATION NO. : 09/503181
DATED : October 27, 2009
INVENTOR(S) : Yair Frankel et al.

It is certified that error appears in the above-identified patent and that said Letters Patent is hereby corrected as shown below:

On title page, under Related U.S. Application Data, please insert the following priority claim:
-- Continuation-In-Part of U.S. Patent Application No. 09/492,534, filed Jan. 27, 2000, now U.S. Pat. No. 7,184,988. --

Signed and Sealed this
Seventeenth Day of May, 2011

David J. Kappos
*Director of the United States Patent and Trademark Office*